(12) United States Patent
Lee (10) Patent No.: US 8,988,644 B2
(45) Date of Patent: Mar. 24, 2015

(54) LIQUID CRYSTAL DISPLAY

(71) Applicant: Samsung Display Co., Ltd., Yongin, Gyeonggi-Do (KR)

(72) Inventor: Mi Sun Lee, Goyang-si (KR)

(73) Assignee: Samsung Display Co., Ltd. (KR)

( * ) Notice: Subject to any disclaimer, the term of this patent is extended or adjusted under 35 U.S.C. 154(b) by 63 days.

(21) Appl. No.: 13/829,801

(22) Filed: Mar. 14, 2013

(65) Prior Publication Data

US 2013/0293820 A1    Nov. 7, 2013

(30) Foreign Application Priority Data

May 3, 2012   (KR) .................. 10-2012-0047146

(51) Int. Cl.
*G09G 3/36*   (2006.01)
*G02F 1/1343*   (2006.01)
*G02F 1/1362*   (2006.01)

(52) U.S. Cl.
CPC .... *G02F 1/134336* (2013.01); *G02F 1/134309* (2013.01); *G02F 1/136286* (2013.01); *G02F 2001/134372* (2013.01); *G02F 2201/121* (2013.01)
USPC ................. 349/143; 349/37; 349/39

(58) Field of Classification Search
CPC ........................................... G02F 2001/134372
USPC ............................................... 349/143, 37, 39
See application file for complete search history.

(56) References Cited

U.S. PATENT DOCUMENTS

| 6,624,869 | B2 | 9/2003 | Lee | |
|---|---|---|---|---|
| 6,724,455 | B2 | 4/2004 | Kondo et al. | |
| 7,859,628 | B2 | 12/2010 | Park et al. | |
| 7,978,294 | B2 | 7/2011 | Lee et al. | |
| 2006/0081850 | A1* | 4/2006 | Lee et al. ................. | 257/72 |
| 2008/0284967 | A1 | 11/2008 | Oh et al. | |
| 2009/0290081 | A1* | 11/2009 | Cho et al. ................. | 349/42 |
| 2010/0110359 | A1* | 5/2010 | Lee et al. ................. | 349/149 |
| 2011/0090446 | A1* | 4/2011 | Kim et al. ................. | 349/139 |
| 2011/0181805 | A1 | 7/2011 | Nagami | |
| 2011/0273654 | A1* | 11/2011 | Wang et al. ............... | 349/143 |

FOREIGN PATENT DOCUMENTS

| KR | 10-2006-0000608 A | 1/2006 |
|---|---|---|
| KR | 10-2006-0000821 A | 1/2006 |
| KR | 10-2008-0048722 A | 6/2008 |
| KR | 10-2009-0015737 A | 2/2009 |
| KR | 10-2011-0071036 A | 6/2011 |
| KR | 10-2011-0075944 A | 7/2011 |

* cited by examiner

*Primary Examiner* — Dennis Y Kim
(74) *Attorney, Agent, or Firm* — Innovation Counsel LLP (57) ABSTRACT

A liquid crystal display has its common electrode and pixel electrodes formed on a same substrate where the substrate further includes a plurality of common voltage transmitting lines disposed under both of the common electrode and the pixel electrodes and forming a ladder-like network connected to the common electrode at multiple connection locations for providing the common voltage to the common electrode by way of conduction paths having substantially lower resistivity than the common electrode, whereby an RC delay factor of transmitting the common voltage is reduced.

24 Claims, 8 Drawing Sheets

LIQUID CRYSTAL DISPLAY

CROSS-REFERENCE TO RELATED APPLICATION

This application claims priority to and the benefit of Korean Patent Application No. 10-2012-0047146 filed in the Korean Intellectual Property Office on May 3, 2012, the entire contents of which application are incorporated herein by reference.

BACKGROUND (a) Field of Disclosure

The present disclosure of invention relates to liquid crystal displays.

(b) Description of Related Technology

Liquid crystal displays are a type of flat panel display that are widely used today. Typically, a liquid crystal display includes two spaced apart display panels or signals on which respective field generating electrodes are disposed; such as a pixel electrode on a first of the panels and a common electrode on the second of the panels. A liquid crystal (LC) layer is interposed between the panels. The liquid crystal display (LCD) displays an image is response to application of a voltage between the field generating electrodes, where the latter generates an electric field through the interposed liquid crystal (LC) layer, thereby determining an optical orientation direction of liquid crystal molecules of the liquid crystal layer and controlling the polarization of light passing through. The transmittance of the liquid crystal display may be changed by selectively controlling the orientations of the liquid crystal molecules.

Meanwhile, in one class of liquid crystal displays, rather than being respectively disposed on spaced apart panels, the pixel electrodes and the common electrode that are used for generating the electric field are provided on a same one display panel on which the switching elements for the pixel units are also formed. In the case of the liquid crystal display of this form, a contact hole is typically formed to connect a common voltage providing line that transmits a common voltage from a source circuit to the common electrode. However the aperture ratio of the liquid crystal display is deteriorated when such a contact hole is provided for the common voltage providing line.

Additionally, in one class of embodiments, at least one of a gate lines driver and a data lines driver of the liquid crystal display is directly included in (e.g., monolithically integrated on) or directly mounted to the display panel for example in the form of a plurality of IC chips mounted on the panel, or is mounted to a flexible circuit film which is then attached to the display panel. However, the data line drives (e.g., IC chips) can consume a high ratio of a manufacturing cost of the liquid crystal display and occupy a large surface area thereof. More particularly, as the number of data lines applying respective data voltages to corresponding columns of pixels is increased (for purpose of increasing image resolution) the cost of the driver circuitry of the liquid crystal display is disadvantageously increased.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a system that can reduce the size and cost of the data lines driver circuit of a liquid crystal display while at the same time reducing an RC signal delay the common voltage providing subsystem which is situated in series with the LC capacitance driven by the data lines driver circuit. Additionally, the disclosed system simultaneously reduces the number of data lines so as to reduce driver cost. Moreover, the reduced RC factor can be provided while preventing deterioration of an aperture ratio of the liquid crystal display layout.

Yet more specifically, a liquid crystal display according to an exemplary embodiment of the present disclosure of invention includes: a plurality of pixel electrodes disposed as a matrix of rows and columns on a substrate; a common electrode also disposed on the same substrate and spaced apart from the plurality of pixel electrodes; a plurality of gate lines disposed on the substrate as gate line pairs extending substantially horizontally (in the row direction), with each pair embracing a respective pixel electrodes row at its top and bottom; a plurality of data lines disposed on the substrate and extending vertically between first pairs of immediately adjacent pixel electrodes while not extending vertically between second pairs of immediately adjacent pixel electrodes; a network of common voltage transmitting lines disposed on the substrate and under the combination of the pixel electrodes and the common electrode, the network of common voltage transmitting lines including pairs of first common voltage transmitting line portions extending horizontally and disposed inwardly of and adjacent to respective ones of the gate line pairs of the respective pixel electrode rows, the common voltage transmitting line also including second common voltage transmitting line portions (also denoted herein as transverse line portions) extending vertically between adjacent pixel electrodes where between the data lines do not extend, the first and second common voltage transmitting line portions forming a low resistivity interconnect network that transmits the common voltage to the common electrode, where the latter is composed of a material of higher resistivity. So-called, common voltage conveying through holes are defined through an insulating layer of the substrate for connecting the common voltage transmitting lines network to overlying parts of the common electrode.

In one embodiment, the common voltage conveying through holes are located at terminal ends of respective ones of vertically adjacent, second common voltage transmitting line portions (transverse ones) and are used for electrically connecting, by way of the overlying common electrode portion.

The liquid crystal display may further include a light blocking member overlapping a plurality of gate lines, a plurality of data lines, and the contact hole.

A plurality of pixel electrodes that do not overlap the light blocking member may have plural domain areas of same upper and lower lengths with respect to a center transverse reference line.

The present disclosure of invention provides a common voltage distribution network scheme that can reduce the cost of the data lines driver of the liquid crystal display by reducing the number of data lines per number of pixel columns and can simultaneously reduce an RC signal delay factor of the common voltage distribution network while preventing deterioration of an aperture ratio of the pixel units of the liquid crystal display.

DETAILED DESCRIPTION

The present disclosure of invention will be described more fully hereinafter with reference to the accompanying drawings, in which exemplary embodiments are shown. As those skilled in the art would realize from this disclosure, the described embodiments may be modified in various different ways, all without departing from the spirit or scope of the present teachings.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a liquid crystal display according to an exemplary embodiment of the present disclosure will be firstly described with reference to an exemplary embodiment shown in FIG. 1 to FIG. 6.

Figure 1:
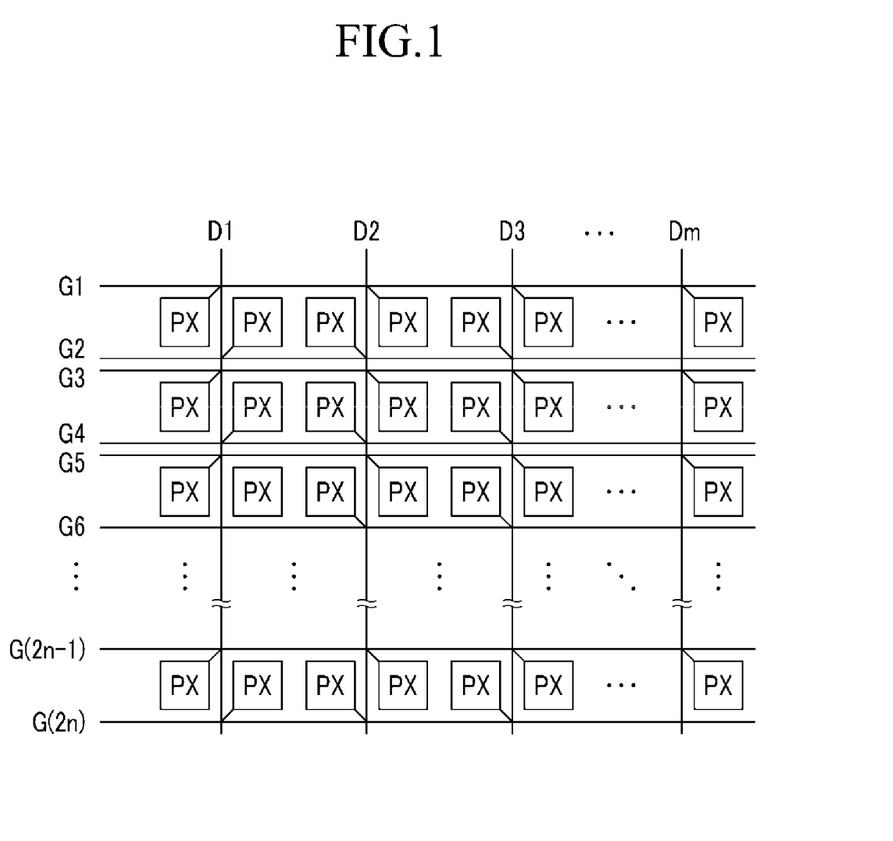
FIG. 1 is a schematic top plan view of a pixel arrangement of a liquid crystal display according to an exemplary embodiment of the present disclosure.
Figure 2:
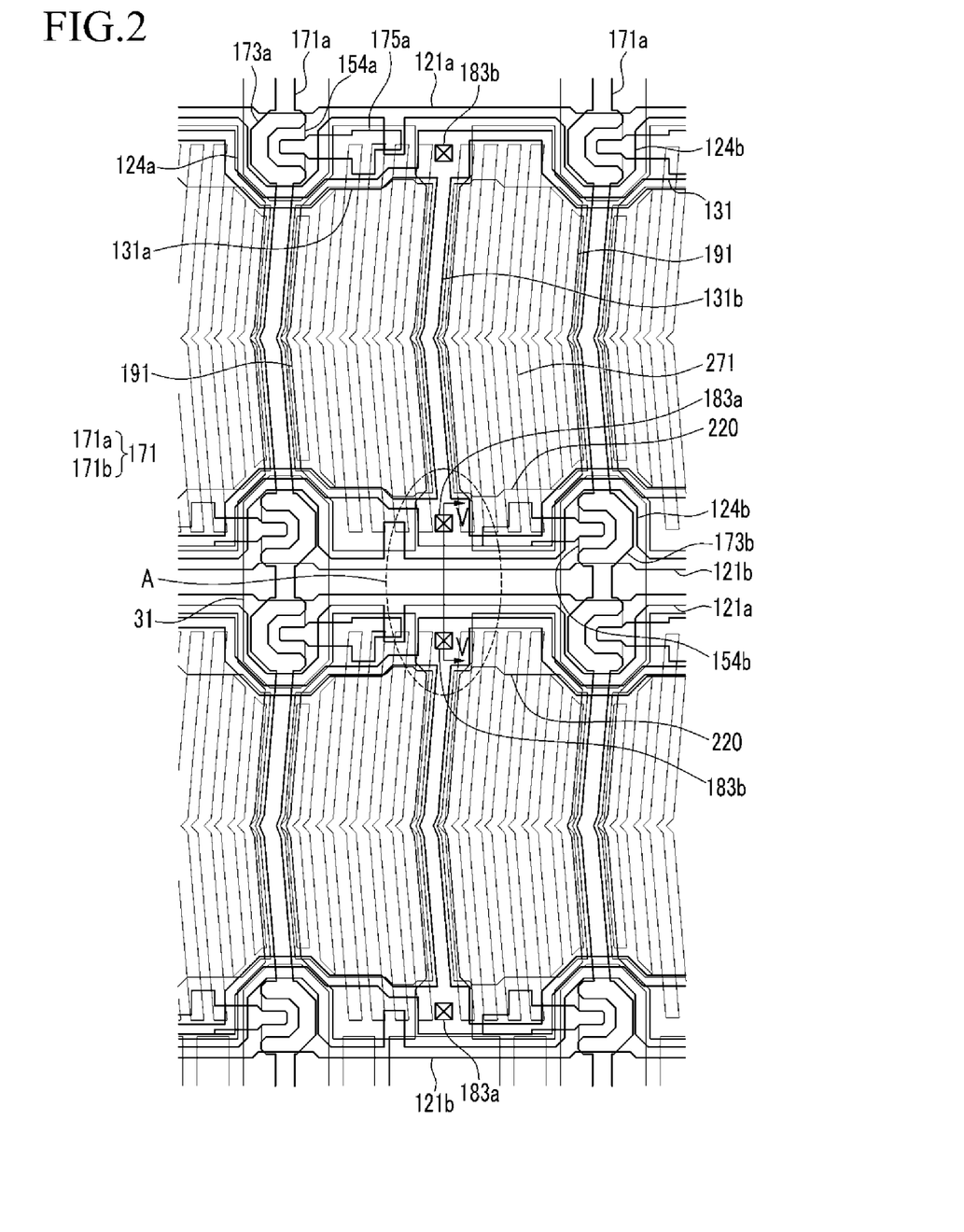
FIG. 2 is a more-to-scale layout view of a liquid crystal display according to an exemplary embodiment.
Figure 3:
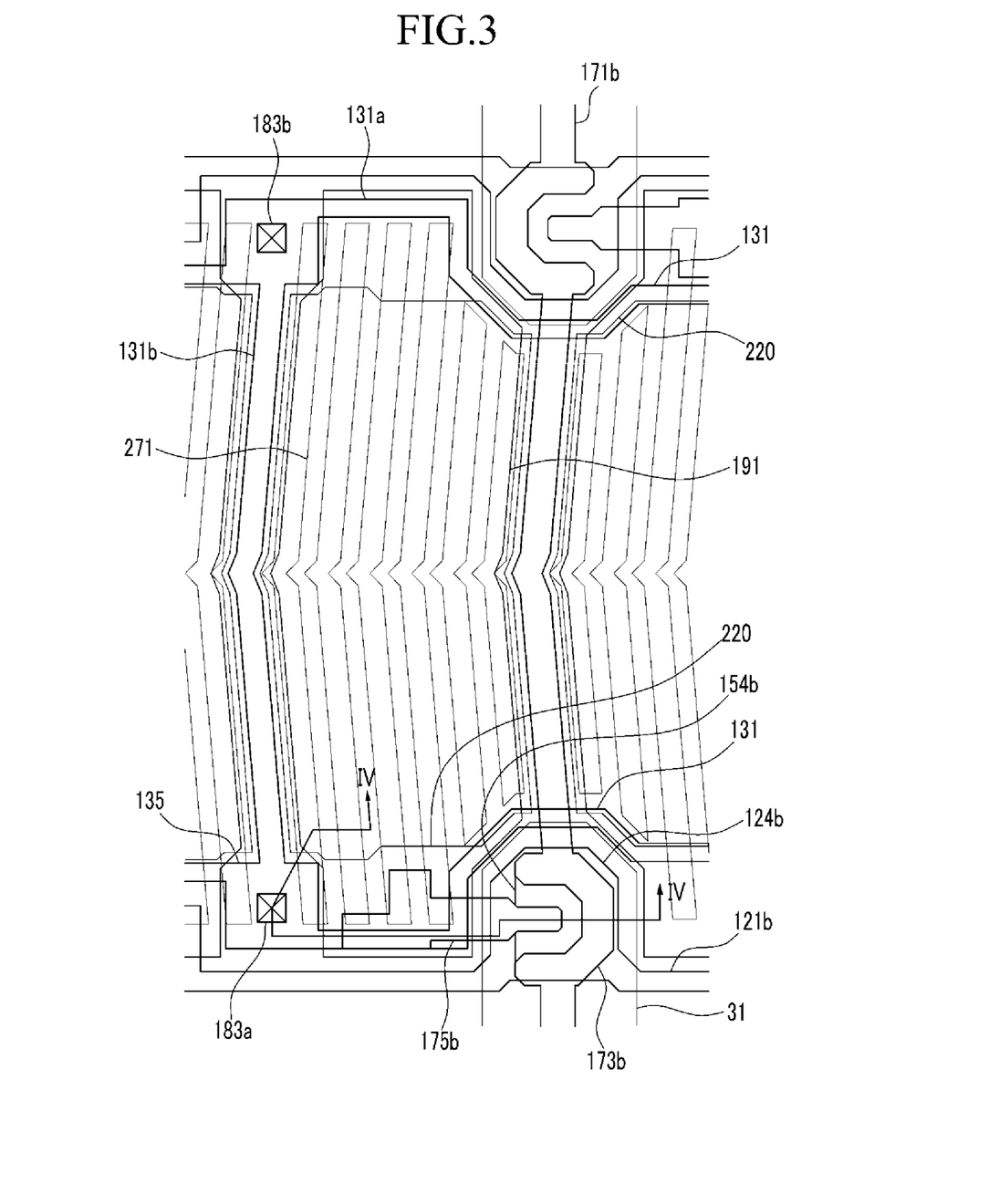
FIG. 3 is an enlarged layout view showing one pixel unit of the liquid crystal display of FIG. 2.
Figure 4:
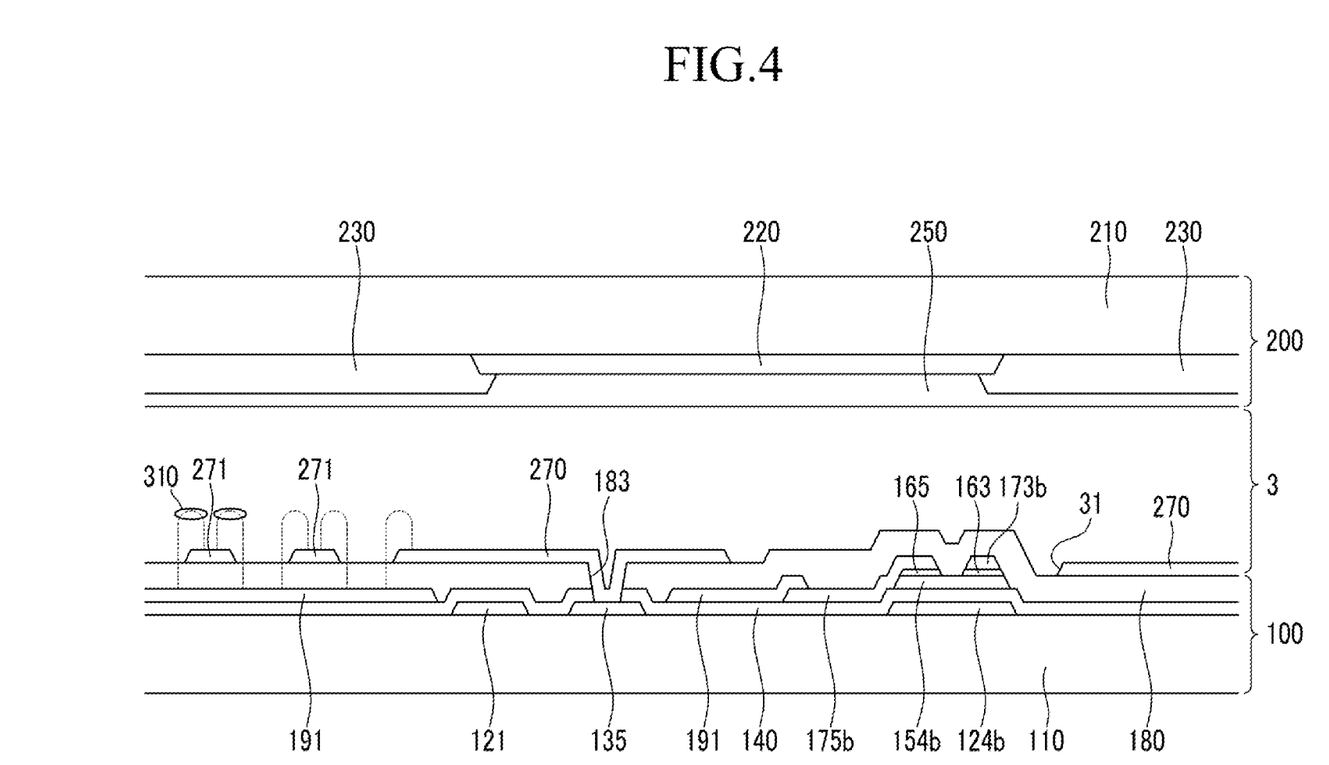
FIG. 4 is a cross-sectional view of the pixel unit of FIG. 3 taken along sectioning line IV-IV.
Figure 5:
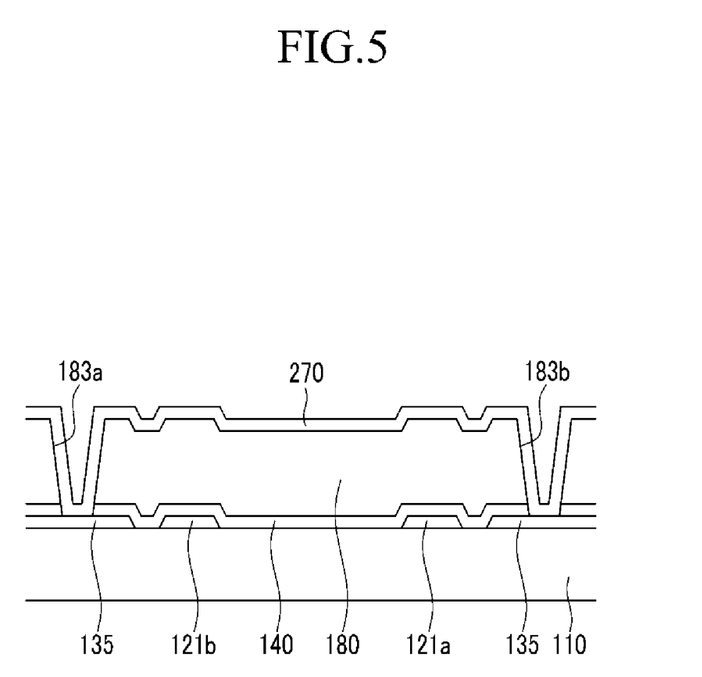
FIG. 5 is a cross-sectional view taken along line V-V of FIG. 2.
Figure 6:
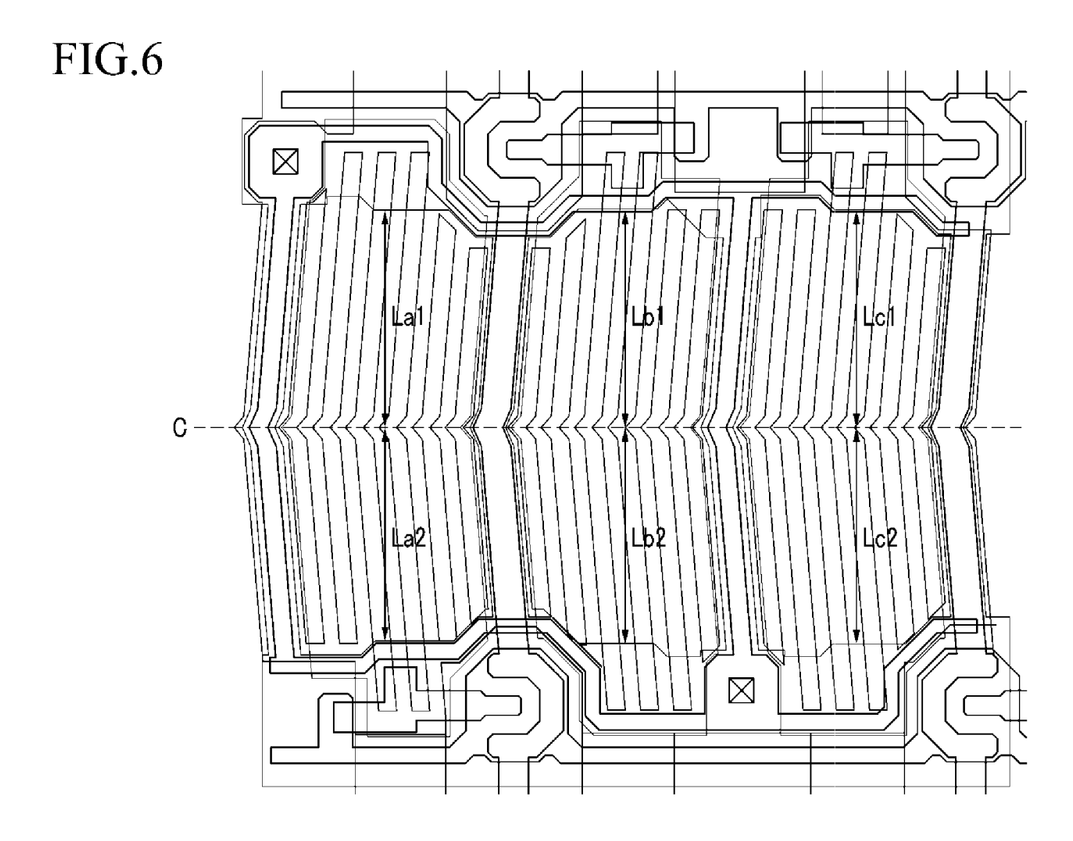
FIG. 6 is a view partially showing a few pixel units of the liquid crystal display of FIG. 2.

FIG. 1 is a schematic layout view of a pixel arrangement of a liquid crystal display according to the exemplary embodiment and shows how one data line can service two columns of pixels. FIG. 2 is a more-to-scale and more detailed layout view of the liquid crystal display according to the exemplary embodiment. FIG. 3 is a layout view showing just one pixel of the liquid crystal display of FIG. 2. FIG. 4 is a cross-sectional view of the pixel of FIG. 3 taken along line IV-IV. FIG. 5 is a cross-sectional view taken along line V-V of FIG. 2. FIG. 6 is a view partially showing a few of the pixel units of the liquid crystal display of FIG. 2.

Referring to FIG. 1 in more detail, a liquid crystal display according to the respective exemplary embodiment includes a plurality of gate lines G1-G(2n) extending in a lateral (horizontal) direction for transmitting corresponding gate signals (referred to also as "scanning signals") to corresponding switching elements (not shown), a plurality of data lines D1-Dm extending in a vertical direction for transmitting data signals to corresponding ones of switching elements (not shown), and a plurality of pixel units PX each of which is understood to contain a respective pixel-electrode and a respective switching element (e.g., a TFT). The gate lines G1 to G(2n) are arranged in parallel with each other and extend substantially in the row direction (the horizontal direction). The data lines D1 to Dm are arranged in parallel with each other and extend substantially in the column direction (the vertical direction in the drawing).

Each pixel unit PX includes a respective pixel electrode (not shown) which is charged with a corresponding data signal supplied to it through a respective switching element (e.g., thin film transistor, not shown). The switching element (e.g., TFT) is connected to a respective one of the gate lines G1-G(2n) and a respective one of the data lines D1-Dm. Additionally, a common electrode (not shown) is provided on the same substrate in spaced apart facing relation to the pixel electrode and is configured to receive a common voltage Vcom supplied from a common voltage sourcing circuit (not shown) by way of a common voltage supplying line (not yet shown).

In the illustrated configuration, pairs of gate lines such as G1 and G2, such as G3 and G4, . . . , etc. are disposed to straddle above and beneath each corresponding pixel row (e.g., G1 and G2 straddle the top most row). In other words, the pixels PX of one pixel row are connected to a respective pair among the straddling pairs of gate lines G1 and G2, G3 and G4, . . . , etc.

Further, one data line D1-Dm is provided for and disposed between every successive pair of pixel columns. That is, one data line such as D1 is disposed between the leftmost first pair of pixel columns. Moreover, each pair of pixel columns includes an odd-numbered pixel column and an even-numbered pixel column. In other words, the pixels PX of the odd-numbered pixel columns are each connected to the data line among D1-Dm that is directly neighboring at its right side and through a likewise located switching element (not shown), and the pixels PX of the even-numbered pixel columns are each connected to the data line among D1-Dm that is directly neighboring at its left side through the corresponding switching element.

The liquid crystal display further includes a gate lines driver circuit (not shown). The gate lines driver circuit is connected to the gate lines G1-G(2n), and applies corresponding gate signals each formed by an over-time combination of a gate-on voltage Von that can turn on the switching element and a gate-off voltage Voff that can turn off the switching element.

The liquid crystal display further includes a data lines driver circuit (not shown). The data lines driver circuit is connected to the data lines D1-Dm to apply the data voltage to the data lines D1-Dm. From an equivalent circuit point of view, the data lines driver circuit may be seen as a plurality of voltage sources each having a respective parasitic series resistor coupling the voltage source to its respective data line.

At least one of the gate driver and the data driver may be formed on the same substrate on which the pixel units PX are formed.

Given that the data lines D1-Dm are disposed a one data line per two pixel columns and the data signal is alternately applied to the pixels disposed at two pixel arrays disposed at both sides with reference to the data lines D1-Dm, a number of data lines D1-Dm may be reduced, thereby reducing the cost of the data lines driver circuit of the liquid crystal display at least because the number of connection terminals and the number of equivalent circuit voltage sources is reduced.

Next, one example of the pixel structure of the liquid crystal display shown in FIG. 1 will be described with reference to FIG. 2 and FIG. 3.

Referring to FIG. 2 to FIG. 4, the liquid crystal display according to an exemplary embodiment of the present invention includes a lower panel 100 and an upper panel 200 facing each other, and a liquid crystal layer 3 interposed between the two display panels 100 and 200.

Firstly, the lower panel 100 will be described.

In a same fabrication layer of the device there are formed out of at least one common wiring material, features 121a, 121b, and 131 where among these are a plurality of first gate lines 121a, a plurality of second gate lines 121b, and a plurality of common voltage transmitting lines 131. In one embodiment, features 121a, 121b, and 131 are formed as one layer directly on an insulation substrate 110.

The first gate line 121a and the second gate line 121b transmit respective gate signals and extend substantially in the transverse direction and are alternately disposed along the column direction. The first gate line 121a and the second gate line 121b form one pair, and the first gate line 121a is closer to a second gate line 121b of another pair disposed upward than the second gate line 121b disposed downward.

The gate lines 121a and 121b respectively include a plurality of first gate electrodes 124a and second gate electrodes 124b integrally branching therefrom and expanded at the locations of their respective TFTs.

The common voltage transmitting lines 131 include transverse portions 131a (see FIG. 3, also referred to herein as first common voltage transmitting line portions 131a) extending transversely between the two gate lines 121a and 121b and disposed at the top and at the bottom edges of a corresponding one pixel row. The common voltage transmitting lines 131 further include longitudinal portions 131b (see FIG. 3, also referred to herein as second common voltage transmitting line portions 131b) extending vertically and integrally from the transverse portions 131a so as to be disposed parallel to and in between the neighboring data lines. The longitudinal portions 131b each includes an expansion 135 portion at which a contact hole is provided (where the contact hole is also referred to herein as a common voltage conveying hole).

The longitudinal portion 131b connects two common voltage transmitting lines 131 disposed at upper and lower regions in one pixel row. (As best seen in FIG. 3, the two common voltage transmitting lines 131 include the transverse portions 131a that are co-extensive therewith.)

Accordingly, a signal delay of the two parallel wise extending common voltage transmitting lines 131 are reduced by presence of the longitudinal or cross-bar forming portions 131b which, together with the transverse portions 131a.

As best seen ion FIG. 4, a gate insulating layer 140 made of a silicon nitride (SiNx) or a silicon oxide (SiOx) is formed on the gate layer conductors 121a, 121b, and 131. Then, a plurality of semiconductive islands 154a and 154b made for example of hydrogenated amorphous silicon (amorphous silicon may be abbreviated to a-Si) or polysilicon are formed on the gate insulating layer 140.

The semiconductive islands 154a and 154b include a first semiconductor 154a and a second semiconductor 154b extending toward the first gate electrode 124a and the second gate electrode 124b. The semiconductive islands 154a and 154b are respectively only disposed over (and insulated from) the respective gate electrodes 124a and 124b.

A plurality of ohmic contacts 163 and 165 are formed on the semiconductors 154a and 154b. The ohmic contact 163 and the ohmic contact 165 face each other with respect to the first and second gate electrodes 124a and 124b, form a pair, and are disposed on the first and second semiconductors 154a and 154b. The ohmic contacts 163 and 165 may be made of a same material such as a n+ hydrogenated a-Si that is heavily doped with an n-type impurity, or of a silicide. However, in a case of the liquid crystal display according to another exemplary embodiment, the ohmic contacts 163 and 165 may be omitted.

Data layer conductors 171, 175a, and 175b are provided for defining a plurality of data lines 171 having a plurality of first data lines 171a and a plurality of second data lines 171b and a plurality of drain electrodes 175a and 175b, where the latter are formed on the respective ohmic contacts 165 and the gate insulating layer 140. (And the source electrode 173b is formed on respective ohmic contact 163.)

The data lines 171 transmit respective data signals and extend in a longitudinal direction, thereby intersecting in a cross-over manner with the gate lines 121. Each data line 171 includes a plurality of first source electrodes 173a branching therefrom and a plurality of second source electrodes 173b branching therefrom and extending toward the respective gate electrodes 124a and 124b. The data lines 171 are each periodically curved or otherwise knee-shaped to thereby form an oblique angle with the horizontal extending direction of the gate lines 121. The oblique angle of the data line 171 and the extension direction of the gate line 121 may be 45 degrees or bigger. However, in case of another liquid crystal display according to another exemplary embodiment, the data lines 171 may each extend straightly.

The first/the second drain electrode 175a/175b respectively include one end facing the first/the second source electrode 173a/173b with respect to the respective first/the second gate electrode 124a/124b and opposed respective other ends.

The first/the second gate electrode 124a/124b, the first/the second source electrode 173a/173b, and the first/the second drain electrode 175a/175b form a thin film transistor (TFT) as a switching element along with the first/the second semiconductor 154a/154b. The semiconductors 154a and 154b except for a channel portion between the source electrodes 173a and 173 and the drain electrodes 175a and 175b may have substantially the same plane shape as the data lines 171, the drain electrodes 175a and 175b, and the underlying ohmic contacts 163 and 165.

A plurality of pixel electrodes 191 are formed to make respective contacts on respective contact portions of the drain electrode 175a and 175b and to further extending over the gate insulating layer 140.

Each pixel electrode 191 includes a pair of longitudinal edges parallel to the curved edges of the data lines 171.

The pixel electrode 191 covers the contact portion of the respective drain electrode 175a or 175b and is disposed thereon, thereby being physically and directly connected to the respective drain electrode 175a or 175b.

The pixel electrode 191 may be made of a transparent conductive material such as polycrystalline, monocrystalline, or amorphous indium tin oxide (ITO) or indium zinc oxide (IZO).

A passivation layer 180 is formed on the patterned data conductor wirings 171, 175a, and 175b, the patterned data conductor wirings 173, the exposed semiconductors 154a and 154b, and the pixel electrodes 191. The passivation layer 180 may be made of an organic insulating material or an inorganic insulating material. When the passivation layer 180 is formed of an organic insulator, it may have photosensitivity and a dielectric constant of less than about 4.0. Alternatively, the passivation layer 180 may have a double-layered structure including a lower inorganic layer and an upper organic layer in order to not harm the exposed portions of the semiconductors 154a and 154b as well as to take advantage of the excellent insulating characteristics of the organic layer. The thickness of the passivation layer 180 may be more than about 5000 Å, and is preferably in a range of about 6000 Å to about 8000 Å.

The passivation layer 180 and the gate insulating layer 140 have a plurality of first contact holes 183a and second contact holes 183b respectively exposing the portion of the expansion part 135 of the longitudinal portion 131b of the common voltage transmitting line 131, where as seen in FIG. 4, the common voltage transmitting line 131 (which is understood to be in the same layer as illustrated expansion part 135) runs in the gate metal layer (e.g., 124b, 135, 121) while the common electrode 270, 271 to which the common voltage Vcom is to be transmitted extends in the layer above the passivation layer 180).

The above-mentioned common electrode 270 (and its spaced apart branches 271) is formed on the passivation layer 180 such that the common electrode 270 overlaps the pixel electrodes 191 and includes a plurality of branch electrodes 271 configured for generating respective electric fields with corresponding portions of the pixel-electrode 191 as is indicated in FIG. 4.

More specifically, the spaced apart branch electrodes 271 of the common electrode 270 may be parallel to the curved portion of the data lines 171 and may expose in their spacings apart, similarly shaped regions of the respective pixel electrode 191.

The common electrode 270 may have an opening 31 exposing at least a portion of the gate electrodes 124a and 124b, the semiconductors 154a and 154b, the source electrodes 173a and 173b, and the drain electrodes 175a and 175b forming the thin film transistor. The common electrodes 270 disposed in the pixels adjacent to each other are connected to each other by virtue of the common voltage transmitting lines 131, 131a, 131b and the contacts made through the contact holes 183 to the contact expansion portions 135 of the common voltage transmitting lines.

In other words, the common electrode 270 is physically and electrically connected to the common voltage transmitting lines 131 by the portions of the common electrode 270 that extend through the first contact hole 183a or the second contact hole 183b to make direct contact with the respective expansion portions 135, thereby receiving the common voltage by means of a low resistance signal transmittal network of the transmitting lines 131.

More specifically, and as described above, the network of the transmitting lines 131 is formed by the two common voltage lines 131 disposed respectively near upper and lower edge portions of the respective one pixel row and connected to each other through the longitudinal portion 131b. Moreover, the longitudinal portion 131b of the common voltage transmitting line 131 is disposed between two pixel electrodes 191 in the area therebetween where a data line does not extend. Accordingly, the longitudinal portion 131b is disposed between the two straddling data lines 171a and 171b of the respective pair of pixel columns. Therefore, the longitudinal portion 131b of the common voltage line 131 functions as a resistance lowering connection of the upper and lower two common voltage lines 131. Therefore, the corresponding RC signal delay factor of the common voltage transmitting network 131, 131a, 131b is reduced and the reduction comes without decreasing an aperture ratio of the associated pixel units because the common voltage transmitting lines 131 are disposed between the data lines 171a, 171b.

Still referring to a portion indicated by a circle A in FIG. 2, the two common voltage transmitting lines 131 passing through that circle A region are disposed between two neighboring pixel rows and are physically separated from each other. However, referring to FIG. 5, they are electrically connected to one another through the portion of the common electrode 270 overlapping at that location where the longitudinal portions 131b of the common voltage transmitting line 131 terminate but are respectively exposed through the first contact hole 183a or the second contact hole 183b. Accordingly, the RC delay factor of the common voltage transmitting network is further reduced by this interconnection between neighboring pixel rows. Therefore, a structure in which the first contact hole 183a and the second contact hole 183b are provided exposing the terminal ends (135) of the two longitudinal common voltage lines 131b respectively disposed in two neighboring pixel rows and separated from each other are nonetheless electrically interconnected to one another by the structure shown in FIG. 5. In other words, the common electrode 270 applied with the common voltage and overlapping two gate lines 121a and 121b neighboring each other provides the interconnection. Additionally, the common electrode 270 which overlaps the gate lines 121a and 121b and has the relatively thick passivation layer 180 interposed therebetween is spaced apart from the gate lines such that signal interference and an unnecessary parasitic capacitance between the gate lines 121a and 121b and the common electrode 270 is prevented.

Next, the upper panel 200 will be described.

Referring to FIG. 4, a light blocking member 220 is formed on an insulation substrate 210 made of transparent glass or plastic. The light blocking member 220 is referred to as a black matrix, it has openings in a matrix form and prevents light leakage in areas where it does not have openings.

The light blocking member 220 may cover and block light from reaching the thin film transistor, the contact holes 183a and 183b, the gate lines 121a and 121b, the transverse portion 131a of the common voltage line 131, and the contact holes 183a and 183b exposing the longitudinal portion 131b of the common voltage line 131.

However, in the case of a liquid crystal display according to another exemplary embodiment of the present invention, the light blocking member 220 may be disposed in the lower panel 100.

A plurality of color filters 230 are formed on the substrate 210.

Each of the color filters may uniquely pass the band of one of primary colors, for example, three primary colors of red, green, and blue, or yellow, cyan, and magenta. Although not shown, the color filters may further include filters that pass a mixture of bands of the primary colors or a white light as well as passing only the primary colors. The color filter 230 is made of an organic material. Most of the color filter 230 may be formed in a region enclosed by the light blocking member 220. Each color filter 230 may be extended according to the data line 171, and two neighboring color filters 230 may overlap on the boundary of the data line 171.

However, in the case of a liquid crystal display according to another exemplary embodiment, the color filter 230 may be disposed in the lower panel 100. In this case (not shown), the color filter 230 may be disposed between the passivation layer 180 and the common electrode 270, and an additional insulating layer covering the color filter 230 may be included.

An overcoat 250 is formed on the light blocking member 220 and the color filter. The overcoat 250 may be made of an (organic) insulating material. The overcoat 250 may be omitted.

The liquid crystal layer 3 includes a nematic liquid crystal material having positive dielectric anisotropy. Liquid crystal molecules 310 of the liquid crystal layer 3 are arranged such that their longer axes are parallel to the display panels 100 and 200, and they are spirally twisted by 90° starting from the rubbing direction of an alignment layer provided in the lower panel 100 to reach the upper display panel 200.

The pixel electrode 191 receives a data voltage from the drain electrodes 175a and 175b, and the common electrode 270 receives a reference voltage (Vcom) of a predetermined magnitude generated by a reference voltage signal (Vcom) generator circuit (not shown) and transmitted to the common electrode by way of the reference voltage transmitting line 131. In one embodiment, the reference voltage signal (Vcom) may include an AC component such as in the case of per frame polarity reversal where the magnitude of the reference voltage signal has an opposed polarity from that it had in a previous frame.

When the pixel electrode 191 is charged with a respective data voltage, creates an electric field extending between it and he common electrode 270, where the latter is supplied with the common voltage. Accordingly, the liquid crystal molecules 310 of the liquid crystal layer 3 positioned between two electrodes 191 and 270 are rotated in a direction such as that parallel to the direction of the electric field. Polarization of light that passes through the liquid crystal layer changes depending on the rotation direction of the liquid crystal molecules 310.

Like this, by the electric field formed between the branch electrodes 271 of the common electrode 270 and the pixel electrode 191, the liquid crystal molecules 310 of the liquid crystal layer 3 of the liquid crystal display are rotated.

Next, a domains dividing aspect of a liquid crystal display according to an exemplary embodiment of the present invention will be described with reference to FIG. 6.

Referring to FIG. 6, the domains of the liquid crystal display according to an exemplary embodiment may be divided into an upper region and a lower region with respect to an imaginary center transverse line C crossing a center portion of the pixel area, and lengths La1, La2, and La3 of the upper region of the pixel area and length Lb1, Lb2, and Lb3 of the lower region of the pixel area may be the same. Like this, the upper region and the lower region of the domains region of the pixel area have the same lengths, when viewing in the up/down and right/left sides of the liquid crystal display, so the displayed image may be uniform. If the upper region and the lower region of the domains region of the pixel area have different lengths, brightness may be different according to a viewing angle of the liquid crystal display, and thereby the display image quality may be decreased.

The pixel electrode 191 of the liquid crystal display according to an exemplary embodiment is disposed between the gate insulating layer 140 and the passivation layer 180 and covers the portion of the drain electrode 175 to be physically and electrically connected, and thereby the aperture ratio is increased compared with a conventional liquid crystal display in which the pixel electrode and the drain electrode are connected through a drain contact hole.

Also, in the liquid crystal display according to an exemplary embodiment, one data line is disposed per two pixel columns and the data signal is alternately applied to the pixel disposed in one of the two pixel columns. Therefore, the number of data lines (and driver circuit terminals) may be reduced such that the cost of the driver circuit of the liquid crystal display may be reduced.

Also, as described above, the gate lines of the liquid crystal display according to the above exemplary embodiment are overlapped by the common electrode and separated from each other by the relatively thin gate insulating layer and also by the relatively much thicker passivation layer such that capacitive coupling between the gate lines and the overlapping common electrode is kept relatively small. Accordingly the signal interference or the unnecessary parasitic capacitance of the gate line according to the common voltage signal (Vcom) may be prevented.

Figure 7:
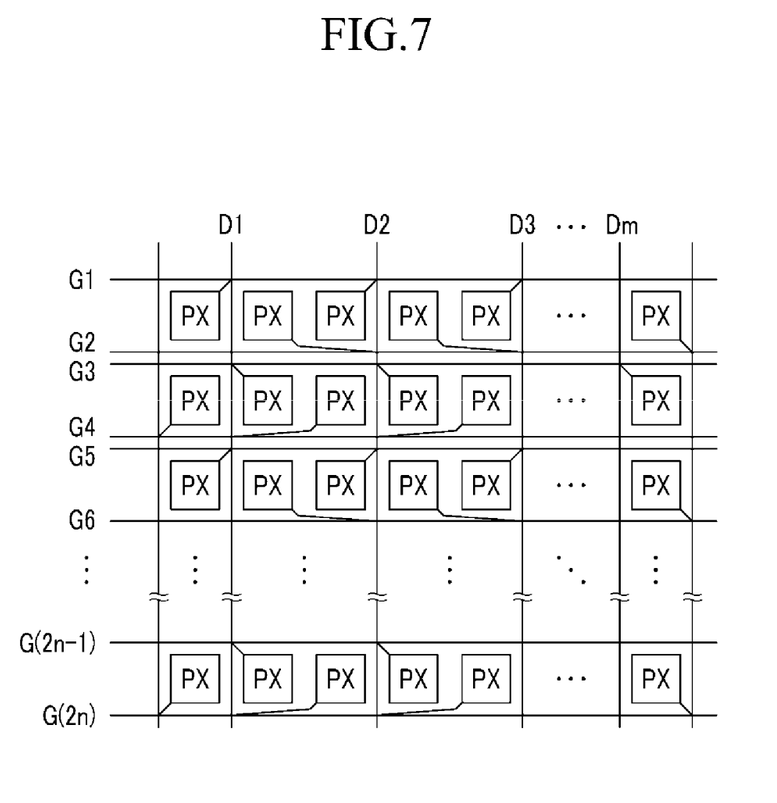
FIG. 7 is a view of a pixel arrangement of a liquid crystal display of another exemplary embodiment.
Figure 8:
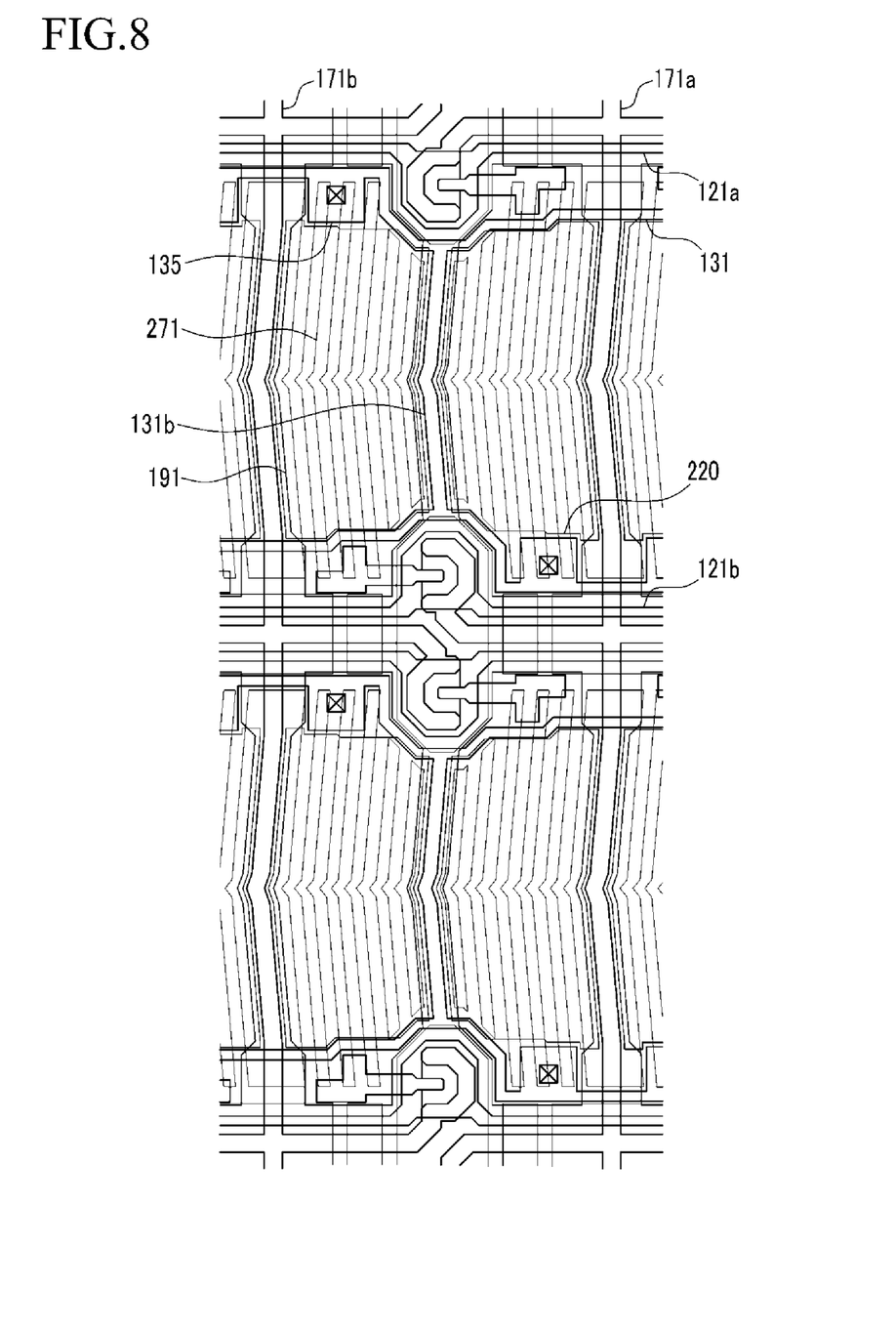
FIG. 8 is a layout view of a liquid crystal display according to an exemplary embodiment of the present invention.

Next, a liquid crystal display according to another exemplary embodiment will be described with reference to FIG. 7 and FIG. 8. FIG. 7 is a schematic top plan view of a pixel arrangement of a liquid crystal display of another exemplary embodiment and FIG. 8 is a more to scale layout view of a liquid crystal display according to the second exemplary embodiment.

Firstly, the arrangement of the signal line and the pixel of the liquid crystal display according to the present exemplary embodiment will be described with reference to FIG. 7.

Referring to FIG. 7, the liquid crystal display of the present exemplary embodiment includes a plurality of display signal lines $G_1$-$G(2n)$, $D_1$-$D_m$, L1, and L2, and a plurality of pixels PX connected thereto and arranged in an approximate matrix shape.

The display signal lines $G_1$-$G(2n)$, $D_1$-$D_m$, L1, and L2 include a plurality of gate lines $G_1$-$G(2n)$ transmitting the gate signals (referred to as "the scanning signals"), the data lines $D_1$-$D_m$ transmitting the data signals, and dummy data lines L1 and L2. The gate lines $G_1$-$G(2n)$ are arranged in parallel with each other and extend approximately in the row direction, the data lines $D_1$-$D_m$ are arranged in parallel with each other and extend approximately in the column direction, and the dummy data lines L1 and L2 extend approximately in the column direction and parallel to each other.

Each respective pair of gate lines $G_1$ and $G_2$, and $G_3$ and $G_4$, . . . etc. are respectively disposed as upper and lower gate lines respectively at the top and under the respective one row of pixels PX of that pair of gate lines. Also, the data lines $D_1$-$D_m$ may be disposed one by one between two columns of the pixels PX. That is, one data line is formed between a pair of pixel arrays and there are pairs of pixel units PX that do not have a data line extending between them. The connection between the gate lines $G_1$-$G(2n)$, the data lines $D_1$-$D_m$, and the pixel PX will be described in detail.

A plurality of pairs of the gate lines $G_1$-$G(2n)$ connected above and under the respective pixels PX of a respective one row are connected to the corresponding pixels PX through the switching element (not shown) formed on or below each pixel PX.

That is, in the odd-numbered pixel row, the pixel PX positioned at the left side with respect to the data lines $D_1$-$D_m$ is connected to the gate lines $G_1$, $G_5$, $G_9$, . . . positioned at the upper side, and the pixel PX positioned at the right side with respect to the data lines $D_1$-$D_m$ is connected to the gate lines $G_2$, $G_6$, $G_{10}$, . . . positioned at the lower side. In contrast, the connection of the upper gate lines $G_3$, $G_7$, $G_{11}$, . . . , the lower gate lines $G_4$, $G_8$, $G_{12}$, . . . , and the pixel PX in the even-numbered pixel row is opposite to that of the odd-numbered pixel row. That is, the pixel PX positioned at the right side with respect to the data lines $D_1$-$D_m$ is connected to the gate lines $G_3$, $G_7$, $G_{11}$, . . . positioned at the upper side, and the pixel PX positioned at the left side with respect to the data lines $D_1$-$D_m$ is connected to the gate lines $G_4$, $G_8$, $G_{12}$, . . . positioned at the lower side.

With the exception of the leftmost data line D1 and the rightmost one Dm, the other data lines, D2-D(m−1) are each alternatingly connected to two pixel units to the left of them for one row and then to two pixel units to the right of them for the next successive row. More specifically, the pixel PX positioned at the left side with respect to the data lines $D_1$-$D_m$ among the pixel PX of the odd-numbered row is connected to the directly neighboring data lines $D_1$-$D_m$, and the pixel PX positioned at the right side with respect to the data lines $D_1$-$D_m$ is connected to the next neighboring data line. The pixel PX positioned at the left side with respect to the data line $D_1$-$D_m$ among the pixel PX of the even-numbered row is connected to the directly previous data lines $D_1$-$D_m$, and the pixel PX positioned at the right side with respect to the data line $D_1$-$D_m$ is connected to the directly neighboring data line. Also, the first column of the even-numbered row pixel PX is connected to the dummy line L1 connected to the final data line $D_m$, and the final column of the odd-numbered row pixel PX is connected to a connection line L2 connected to the first data line $D_1$.

In each pixel row, two pixels PX positioned between two neighboring data lines are connected to the same data lines. That is, in the odd-numbered pixel row, two pixels PX formed between two data lines are connected to the data line positioned at the right side, while in the even-numbered pixel row, two pixels PX formed between two data lines are connected to the data line positioned at the left side.

It is to be understood that the layout arrangement shown in FIG. 8 is only one example, and the connection of the pixel PX of the odd-numbered row and the even-numbered row, and the data lines $D_1$-$D_m$ and the gate lines $G_1$-$G(2n)$ may be exchanged, and different connection relations are possible.

In FIG. 8, driver inversion of the column inversion type may be carried out. Although the data voltage flowing down one data line always has the same polarity during a given frame, the respective data voltages flowing down the two neighboring data lines have the opposite polarities and an apparent inversion of the 1×2 dot inversion type is created.

Like this, if the apparent inversion is the dot inversion, the luminance difference due to a kickback voltage generated when the pixel voltage has the positive polarity and the negative polarity is dispersed such that a vertical line artifact is reduced by the interleaving in the horizontal and vertical directions of the opposed drive polarities.

If a position of the data line connected to the switching element between the neighboring pixel rows is changed, although the driver inversion is the column inversion, the apparent inversion may still be 1×2 dot inversion. Accordingly, the polarity of the data voltage is determined and applied with the column inversion from the data driver such that a selection margin of a material of the data line is increased, and thereby simplification of the manufacturing process is easy, and the apparent inversion is the dot inversion such that the display quality is improved. Furthermore, the number of data lines may be reduced such that the number of expensive data driving circuit chips connected thereto is decreased, and thereby the manufacturing cost of the display device may be largely reduced.

Referring to FIG. 8, the pixel structure of the liquid crystal display according to the exemplary embodiment thereof is similar to the pixel structure of the liquid crystal display according to the exemplary embodiment shown in FIG. 2. As described referring to FIG. 7, the connection relation between the pixel electrode 191 of each pixel PX and the data lines 171a and 171b and the gate lines 121a and 121b is different. However, the detailed layer structure is substantially the same. Accordingly, the description thereof is omitted.

Various features of the liquid crystal display according to the exemplary embodiment described with reference to FIG. 2 to FIG. 6 may be applicable to the liquid crystal display according to the present exemplary embodiment.

In the liquid crystal display according to the exemplary embodiment of FIG. 8, like the liquid crystal display according to the exemplary embodiment shown in FIG. 2, the common voltage transmitting line 131 includes the longitudinal portion 131b connecting two common voltage lines 131 extending respectively adjacent to two gate lines 121a and 121b disposed above on and under one corresponding pixel row. The longitudinal portion 131b of the common voltage transmitting line 131 is disposed between two pixel electrodes 191 disposed between two data lines 171a and 171b. Like this, the longitudinal portion 131b of the common voltage line 131 functioning as the connection of the two neighboring common voltage lines 131 is disposed between two pixel electrodes 191, and thereby, without the reduction of the aperture ratio according to the connection of the common voltage line 131, the signal delay of two neighboring common voltage lines 131 may be reduced.

Also, the contact hole to connect the common voltage line 131 and the common electrode 270 is disposed at the region covered by the light blocking member 220, and thereby the reduction of the aperture ratio according to the contact hole may be reduced.

Also, the domains region of the liquid crystal display have the same upper and lower lengths. Accordingly, when viewing from an angle in the up/down and right/left sides of the liquid crystal display, the displayed image may be uniform. If the upper region and the lower region of the domains region of the pixel area have different lengths, brightness may be different according to a viewing angle of the liquid crystal display, and thereby the display image quality may be decreased.

The pixel electrode 191 of the liquid crystal display according to the exemplary embodiment of FIG. 8 is disposed between the gate insulating layer 140 and the passivation layer 180 and directly covers the portion of the drain electrode 175 to be physically and electrically connected thereto, and thereby the aperture ratio is increased compared with a conventional liquid crystal display in which the pixel electrode and the drain electrode are connected through a drain contact hole.

Also, in the liquid crystal display according to the exemplary embodiment, one data line is disposed per two pixel columns, and thereby the number of the data lines may be reduced such that the cost of the driver of the liquid crystal display may be reduced.

Further, the gate line of the liquid crystal display according to an exemplary embodiment and the common electrode applied with the common voltage overlap each other with the gate insulating layer and the relatively thick passivation layer therebetween, and thereby the signal interference or the unnecessary parasitic capacitance of the gate line according to the common voltage may be prevented.

In the exemplary embodiments described above, although the pixel electrode 191 has a uniform surface shape without any specific cutouts pattern included in the corresponding pixel area and the common electrode does have a specific cutouts pattern in that it is composed of a plurality of linear branch electrodes 271, the present disclosure of invention is not limited thereto, and may be applied to various other cases in which one of two field generating electrodes overlapping each other has a uniform plane shape or a cutouts patterned shape such as that of having a plurality of branch electrodes. Also, the common electrode may have a plane shape without an additional pattern in the pixel area, and the pixel electrode may include the plurality of linear branch electrodes.

In addition, in the above exemplary embodiment, for the arrangement of the pixel electrode and the common electrode with the insulating layer interposed therebetween, the pixel electrode is disposed under the common electrode, however the present disclosure of invention is not limited thereto, and may be applied to other cases in which two field generating electrodes overlap each other with the insulating layer therebetween. For example, the common electrode may be disposed under the insulating layer and the pixel electrode may be disposed above the insulating layer.

While the present disclosure of invention has been provided in connection with what is presently considered to be practical exemplary embodiments, it is to be understood that the present teachings are not limited to the disclosed embodiments, but, on the contrary, they are intended to cover various modifications and equivalent arrangements included within the spirit and scope of the teachings.

What is claimed is:

1. A liquid crystal display comprising:
a substrate;
a plurality of pixel electrodes disposed on the substrate and organized as a matrix having rows of pixel electrodes and columns of pixel electrodes;
a common electrode also disposed on the substrate to be in a spaced apart and electric field forming relation with the pixel electrodes;
a plurality of paired gate lines disposed on the substrate and extending substantially in a direction of the rows of pixel electrodes (pixel electrode rows) with each pair of gate lines respectively having an upper gate line extending adjacent to a top portion of a respective row of pixel electrodes (pixel electrodes row) and a lower gate line extending adjacent to a bottom portion of the respective pixel electrodes row;
a plurality of data lines disposed on the substrate and extending substantially in a direction of the columns of pixel electrodes (pixel electrode columns), the plurality of data lines including a first data line disposed at a left side of a corresponding pair of neighboring first and second pixel electrode columns, wherein no data line is disposed between the corresponding pair of neighboring first and second pixel electrode columns; among the plurality of pixel electrodes and including a second data line disposed at a right side of the corresponding pair of neighboring first and second pixel electrode columns;
a plurality of paired first common voltage transmitting line portions disposed on the substrate and extending substantially in the direction of the rows with each pair of first common voltage transmitting line portions respectively having an upper first common voltage transmitting line portion extending adjacent to the top portion of the respective row of pixel electrodes (pixel electrodes row) and a lower first common voltage transmitting line portion extending adjacent to the bottom portion of the respective pixel electrodes row;
a plurality of second common voltage transmitting line portions disposed on the substrate and extending substantially in the direction of the columns, with each second common voltage transmitting line portion being disposed between the corresponding pair of neighboring first and second pixel electrode columns among the plurality of pixel electrodes and providing a column direction connection between an adjacent pair of the upper and lower first common voltage transmitting line portions,
wherein one of the pixel electrodes and the common electrode has a patterned cutouts shape and the other does not have a patterned cutouts shape.

2. The liquid crystal display of claim 1, further comprising an insulating layer disposed between the first and second common voltage transmitting line portions and the common electrode, the insulating layer having one or more common voltage conveying holes communicating therethrough, and
wherein the common electrode is physically and electrically connected to at least one of the first and second common voltage transmitting line portions through the one or more common voltage conveying holes formed through the insulating layer.

3. The liquid crystal display of claim 2, wherein
the one or more common voltage conveying holes communicate to respective contact portions of respective ones of the second common voltage transmitting line portions.

4. The liquid crystal display of claim 2, wherein
an upper one of the second common voltage transmitting line portions that is disposed in a corresponding upper one of the pixel electrodes rows is connected to a lower one of the second common voltage transmitting line portions that is disposed in a correspondingly neighboring and lower pixel electrodes row by way of at least one of the common voltage conveying holes formed through the insulating layer.

5. The liquid crystal display of claim 4, wherein
the connection of the second common voltage transmitting line portions is formed one by one per two pixel electrode columns among a plurality of pixel electrodes.

6. The liquid crystal display of claim 4, further comprising
a light blocking member having light blocking portions respectively overlapping the gate lines, the data lines, and the common voltage conveying holes.

7. The liquid crystal display of claim 6, wherein
a plurality of pixel electrodes that are not overlapped by the light blocking member are each split into domain areas that have the same upper and lower lengths with respect to a center transverse reference line.

8. The liquid crystal display of claim 7, wherein
the plurality of data lines include a plurality of source electrodes branching integrally therefrom,
wherein the substrate further includes a plurality of drain electrodes in a same layer with and facing the plurality of source electrodes, and
each of the plurality of pixel electrodes is disposed directly on a portion of a respective one of the plurality of drain electrodes.

9. The liquid crystal display of claim 8, wherein
one of two immediately adjacent pixel electrodes in a row is connected to the first data line and the other of the two immediately adjacent pixel electrodes is connected to the second data line and there is no data line extending between the two immediately adjacent pixel electrodes.

10. The liquid crystal display of claim 8, wherein
pairs of two pixel electrodes each are respectively connected as pairs to the first data line and to the second data line respectively.

11. The liquid crystal display of claim 1, further comprising
an insulating layer disposed between the second common voltage transmitting lines and the common electrode,
wherein the common electrode is physically and electrically connected to at least one of the second common voltage transmitting lines through a common voltage conveying hole formed through the insulating layer.

12. The liquid crystal display of claim 11, wherein
the common voltage conveying hole exposes a portion of the at least one of the second common voltage transmitting line.

13. The liquid crystal display of claim 11, wherein
the at least one of the second common voltage transmitting lines is disposed in a respective first pixel electrode row immediately neighboring a second pixel electrode row and is connected to a second of the second common voltage transmitting lines disposed in the second pixel electrode row by way of the common voltage conveying hole formed through the insulating layer.

14. The liquid crystal display of claim 13, wherein the connection between the first and second of the second common voltage transmitting lines is formed on a per row basis only once every two pixel electrode columns along that row.

15. The liquid crystal display of claim 13, further comprising
a light blocking member overlapping a plurality of gate lines, a plurality of data lines, and the contact hole.

16. The liquid crystal display of claim 15, wherein a plurality of pixel electrodes that are not overlapped by the light blocking member each have plural domain areas with respective same upper and lower lengths with respect to a center transverse reference line.

17. The liquid crystal display of claim 16, wherein
the plurality of data lines each include a plurality of source electrodes integrally branching therefrom,
the substrate further has disposed thereon, a plurality of drain electrodes facing the plurality of source electrodes, and
the plurality of pixel electrodes are respectively each disposed directly on a portion of a respective one of the plurality of drain electrodes.

18. The liquid crystal display of claim 17, wherein
one of two immediately adjacent pixel electrodes in a row is connected to the first data line and the other of the two immediately adjacent pixel electrodes is connected to the second of the data line and there is no data line extending between the two immediately adjacent pixel electrodes.

19. The liquid crystal display of claim 17, wherein
pairs of two pixel electrodes each are respectively connected as pairs to the first data line and to the second data line respectively.

20. The liquid crystal display of claim 1, wherein
the plurality of data lines each include a plurality of source electrodes integrally branching therefrom,
the substrate further has disposed thereon, a plurality of drain electrodes facing the plurality of source electrodes, and
the plurality of pixel electrodes are respectively each disposed directly on a portion of a respective one of the plurality of drain electrodes.

21. The liquid crystal display of claim 20, wherein
one of two immediately adjacent pixel electrodes in a row is connected to the first data line and the other of the two immediately adjacent pixel electrodes is connected to the second data line and there is no data line extending between the two immediately adjacent pixel electrodes.

22. The liquid crystal display of claim 20, wherein
pairs of two pixel electrodes each are respectively connected as pairs to the first data line and to the second data line respectively.

23. The liquid crystal display of claim 1, wherein
one of two immediately adjacent pixel electrodes in a row is connected to the first data line and the other of the two immediately adjacent pixel electrodes is connected to the second data line and there is no data line extending between the two immediately adjacent pixel electrodes.

24. The liquid crystal display of claim 1, wherein
pairs of two pixel electrodes each are respectively connected as pairs to the first data line and to the second data line respectively.

* * * * *